(12) United States Patent
Shelor

(10) Patent No.: US 10,112,814 B1
(45) Date of Patent: Oct. 30, 2018

(54) VERTICAL CIRCADIAN HORTICULTURE CONVEYOR

(71) Applicant: Power Greenhouse Integration LLC, Jacksonville, FL (US)

(72) Inventor: F. Mack Shelor, Midlothian, VA (US)

(73) Assignee: Power Greenhouse Integration LLC, Jacksonville, FL (US)

( * ) Notice: Subject to any disclaimer, the term of this patent is extended or adjusted under 35 U.S.C. 154(b) by 0 days.

(21) Appl. No.: 15/425,041

(22) Filed: Feb. 6, 2017

(51) Int. Cl.
*B65G 17/32* (2006.01)
*B66F 7/06* (2006.01)
*B65G 17/12* (2006.01)
*B65G 17/16* (2006.01)
*A01G 9/20* (2006.01)
*A01G 1/00* (2006.01)

(52) U.S. Cl.
CPC .............. *B66F 7/065* (2013.01); *A01G 1/001* (2013.01); *A01G 9/20* (2013.01); *B65G 17/123* (2013.01); *B65G 17/16* (2013.01)

(58) Field of Classification Search
CPC .. A01G 31/042; A01G 31/045; A01G 31/047; B65G 17/32; B65G 17/123; B65G 1/127; B65G 17/40

USPC .................................................. 198/799, 801
See application file for complete search history.

(56) References Cited

U.S. PATENT DOCUMENTS

| 2003/0097786 | A1* | 5/2003 | Van Horssen | A01G 9/1423 47/17 |
| 2010/0236147 | A1* | 9/2010 | Brusatore | A01G 31/047 47/59 R |
| 2012/0279122 | A1* | 11/2012 | Benne | A01G 31/045 47/60 |
| 2013/0255585 | A1* | 10/2013 | Hamman | A01K 61/00 119/200 |
| 2017/0055471 | A1* | 3/2017 | Ng | A01G 31/047 |

* cited by examiner

*Primary Examiner* — James R Bidwell
(74) *Attorney, Agent, or Firm* — Mark Young, P.A.

(57) ABSTRACT

A scalable vertical conveyor cyclically carries planters (i.e. trays) in a closed path through a sub-floor dark zone and an above floor illuminated zone. A dark zone, formed below a floor, provides a dark region that simulates nighttime. The rate of travel simulates a growing day, such as, but not limited to a 24 hour growing day. One or more lighting, irrigation and fertigation elements are provided in the illuminated zone. Optionally, the portion of the conveyor in the dark and illuminated zones are adjustable.

20 Claims, 11 Drawing Sheets

VERTICAL CIRCADIAN HORTICULTURE CONVEYOR

FIELD OF THE INVENTION

This invention relates generally to horticulture, and, more particularly, to a vertical conveyor that cyclically carries planters in a closed path including a dark sub-floor zone simulating nighttime to above-floor illuminated and irrigated zones.

BACKGROUND

Photosynthesis converts energy from the sun, plus carbon dioxide ($CO_2$) and water ($H_2O$) into carbohydrates (such as glucose, $C_6H_{12}O_6$) used for plant growth and oxygen ($O_2$). Photosynthesis takes place in the chloroplasts, specifically using pigments such chlorophyll and carotenoids. Photons that have a wavelength between 400 and 700 nanometers (nm) provide the energy for photosynthesis. More specifically, light is mostly absorbed by chlorophyll in the blue (400 nm-500 nm) and red (600 nm-700 nm) regions (i.e. wavelengths) of the light spectrum and by carotenoids in the blue region.

Daily light integral (DLI) refers to the number of photosynthetic light particles, or photons, received during one day in a particular location and area. The DLI specifically refers to the amount of light received in 1 $m^2$ per day. It is measured in $mol \cdot m^{-2} \cdot d^{-1}$, i.e., moles of light (mol) photons per square meter ($m^{-2}$) per day ($d^{-1}$), with each mol consisting of $6.02 \times 10^{23}$ photons of light.

The maximum natural DLI is about 60 $mol \cdot m^{-2} \cdot d^{-1}$ and occurs outdoors on a cloudless day in the summer when the photoperiod is long. The DLI outdoors may be less than 5 $mol \cdot m^{-2} \cdot d^{-1}$ in the winter on a dark, cloudy, short day in the northern part of the United States or Canada. Inside a greenhouse, the structure and glazing materials commonly reduce light transmission by 35-50 percent. In a greenhouse, values seldom exceed 25 $mol \cdot m^{-2} \cdot d^{-1}$ because of greenhouse glazing materials and superstructure, the season (which affects the sun's angle), cloud cover, day length (photoperiod), shading, and greenhouse obstructions, such as hanging baskets. Therefore, the DLI inside a greenhouse in the United States may be from about 5 to 30 $mol \cdot m^{-2} \cdot d^{-1}$, depending upon location, season and greenhouse configuration.

The DLI that is needed to grow high-quality plants depends upon the crop, but a common target minimum DLI inside a greenhouse is 10-12 $mol \cdot m^{-2} \cdot d^{-1}$. Plant quality generally increases as the average DLI increases. In particular, as the DLI increases, branching, rooting, stem thickness and flower number increase.

When the DLI is low outdoors, growers are wise to maximize the amount of natural light that can reach their crops. For example, in greenhouses shading may be removed, glazing may be cleaned and overhead obstructions may be kept to a minimum. If such measures are impractical or insufficient, the DLI may be increased by supplemental lighting.

While beneficial, supplemental lighting is not without risks. Supplemental lighting outside certain wavelengths may limit productivity. Excessive supplemental lighting may harm plants. Heat from excessive lighting can be detrimental. Photosynthesis and other plant growth processes shut down when the environmental and tissue temperature gets high enough from heat energy that comes with the light. At that point all the water taken up by the plant is used to cool the plant tissue. Plants receiving excessive amounts of light thus dry up, become bleached through the destruction of chlorophyll, and may display other symptoms of excessive stress. At full intensity, supplemental lighting may subject plants to lighting that exceeds the plants' photosynthetic capacity. This may lead to reversible and, eventually, irreversible photoinhibition. While reversible photoinhibition is a temporary protective mechanism, irreversible photoinhibition permanently damages the light-harvesting reactions of the photosynthetic apparatus caused by excess light energy trapped by chloroplasts.

In nature, nighttime substantially reduces risk of heat stress and photoinhibition. In greenhouses with supplemental lighting, lights must be turned off to reduce risk of photoinhibition, leaving all plants simultaneously in a state of darkness.

What is needed is an efficient scalable growing system, that mimics natural daylight and nighttime conditions to ensure a DLI suitable for optimal plant growth without causing heat stress. The system should expose some plants to nighttime darkness while others are exposed to daylight illumination, irrigation and fertigation. Preferably, the system includes vertically oriented conveyors for high density growing that uses available vertical space. The invention is directed to overcoming one or more of the problems and solving one or more of the needs as set forth above.

SUMMARY OF THE INVENTION

To solve one or more of the problems set forth above, in an exemplary implementation of the invention, a scalable vertical conveyor that cyclically carries planters (i.e. trays) in a closed path through a sub-floor dark zone and an above floor illuminated zone is provided. The dark zone, formed below a floor, provides a dark relatively cool region that simulates nighttime. The rate of travel simulates a growing day, such as, but not limited to a 24 hour growing day. One or more lighting elements are provided in the illuminated zone. Irrigation and fertigation are also provided in the illuminated zone. In one exemplary embodiment, the height of the conveyor is adjustable, with the portions in the dark and illuminated zones thereby being adjustable.

An exemplary vertical horticulture conveyor system for growing plants according to principles of the invention includes a path of travel defined by a pair of spaced apart continuous roller chains. The pair of spaced apart continuous roller chains are in parallel alignment. Each of the pair of spaced apart continuous roller chains includes a plurality of coupled pivoting links. The path of travel includes a top section having a first end and an opposite second end, a bottom section has a first end and an opposite second end, a descending section extending from the second end of the top section to the second end of the bottom section, and an ascending section opposite the descending section and extending from the first end of the top section to the first end of the bottom section. A motor operably coupled to at least one of the pair of spaced apart continuous roller chains causes links of the pair of spaced apart continuous roller chains to move in unison along the path of travel. Each of the continuous roller chains is trained over a plurality of sprockets, defining the path of travel.

A plurality of plant trays are provided. Each tray is removably attached to and suspended upright between the pair of spaced apart continuous chains. The plurality of plant trays may be evenly spaced apart.

A floor with first and second openings is provided. The ascending section of the path of travel extends through the first opening, and the descending section of the path of travel extends through the second opening. Space above the floor is illuminated, and space below the floor is substantially devoid of illumination. The bottom section of the path of travel is in the space below the floor, and the top section of the path of travel is in the space above the floor. The path of travel includes an above-floor portion of the ascending section of the path of travel in the space above the floor, and a below-floor portion of the ascending path of travel in the space below the floor, an above-floor portion of the descending section of the path of travel in the space above the floor, and a below-floor portion of the descending path of travel in the space below the floor. Each of the first and second openings is sized to allow passage of each of the plurality of plant trays suspended by the suspension hooks from the pair of bolts without any of the plurality of plant trays contacting the floor. Optionally, a flexible flap is provided at each of the first and second openings. The flexible flap deflects to allow passage of each of the plurality of plant trays.

Each of the plurality of plant trays includes an open top. Each of the plurality of plant trays includes a right side and a left side. The right side is opposite the left side. Each of the plurality of plant trays further includes a pair of suspension hooks, including a right side suspension hook attached to the right side of the plant tray, and a left side suspension hook attached to the left side of the plant tray. The right side hook is opposite the left side hook. Each of the pair of suspension hooks extends upwardly above the open top of the plant tray.

A pair of bolts is provided for suspending each of the plurality of plant trays. Each pair of bolts includes a right side bolt and a left side bolt. Each right side bolt is attached to one of the pivoting links of one of the pair of spaced apart continuous roller chains. Each left side bolt is attached to one of the pivoting links of the other of the pair of spaced apart continuous roller chains. Each right side bolt of each pair of bolts is opposite and in alignment with the left side bolt for the pair of bolts. Each of the plurality of plant trays is suspended by the suspension hooks from the pair of bolts. Each of the plurality of plant trays suspended by the suspension hooks from the pair of bolts has a center of mass below the pair of bolts.

Each of the plurality of plant trays travels the entire path of travel in a cycle. The cycle is a time duration, which includes a first portion and a second portion. The first portion of the cycle is a time duration above the floor. The second portion of the cycle is a time duration below the floor. In one exemplary embodiment, the cycle may be about 24 hours, with the first portion being from 12 to 21 hours and the second portion being from 3 to 12 hours. The plurality of plant trays may consist of 24 evenly spaced apart plant trays with each of the plurality of plant trays traveling about ¹⁄₂₄th of the path of travel per hour.

Optionally, a height adjustable lift (e.g., a scissor lift) is provided in the space below the floor. The path of travel is supported upon the lift. The lift controls a distance of the bottom section of the path of travel to the floor, elevating the bottom section of the path of travel to reduce the distance between the bottom section of the path of travel and the floor and reduce the below-floor portion of the path of travel, and lowering the bottom section of the path of travel to increase the distance between the bottom section of the path of travel and the floor and increase the below-floor portion of the path of travel.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
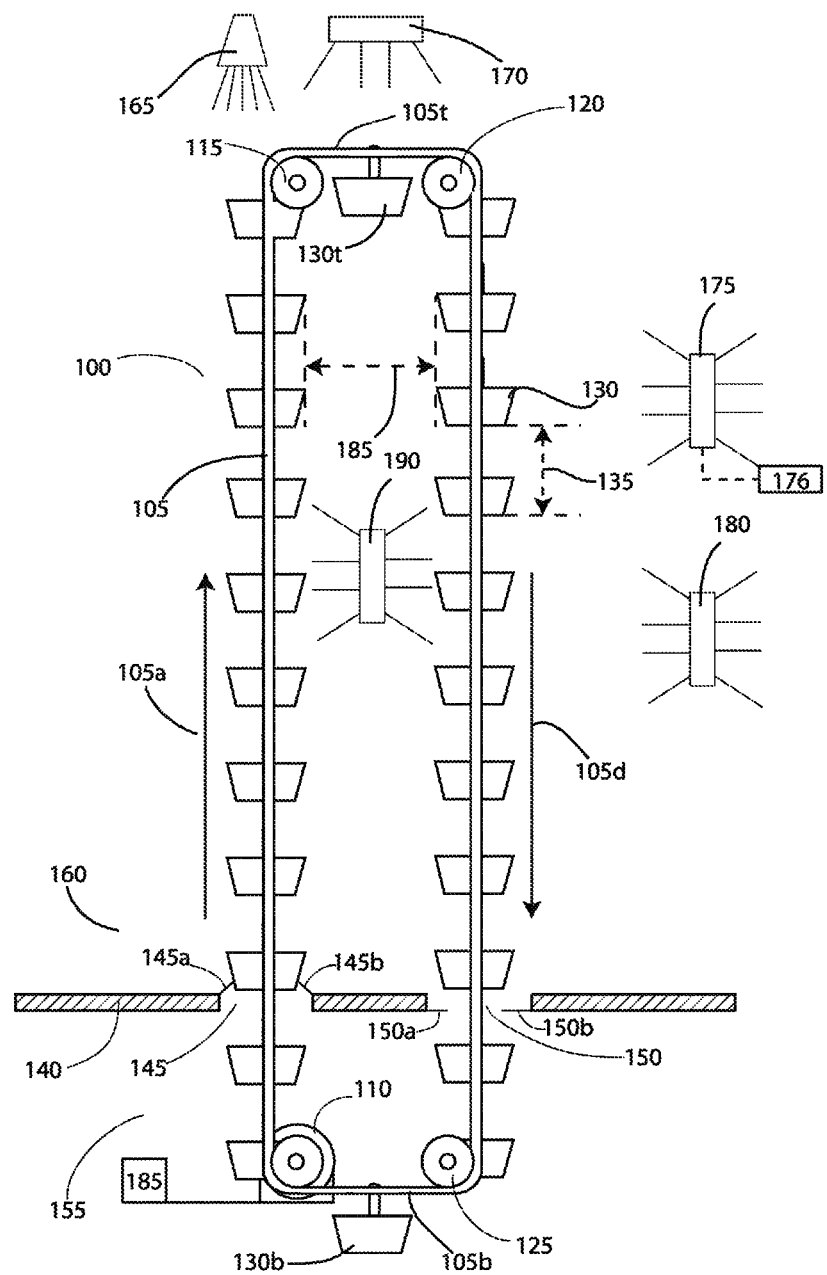
FIG. 1 is a schematic of an exemplary vertical conveyor system with a sub-floor dark zone according to principles of the invention.
Figure 2:
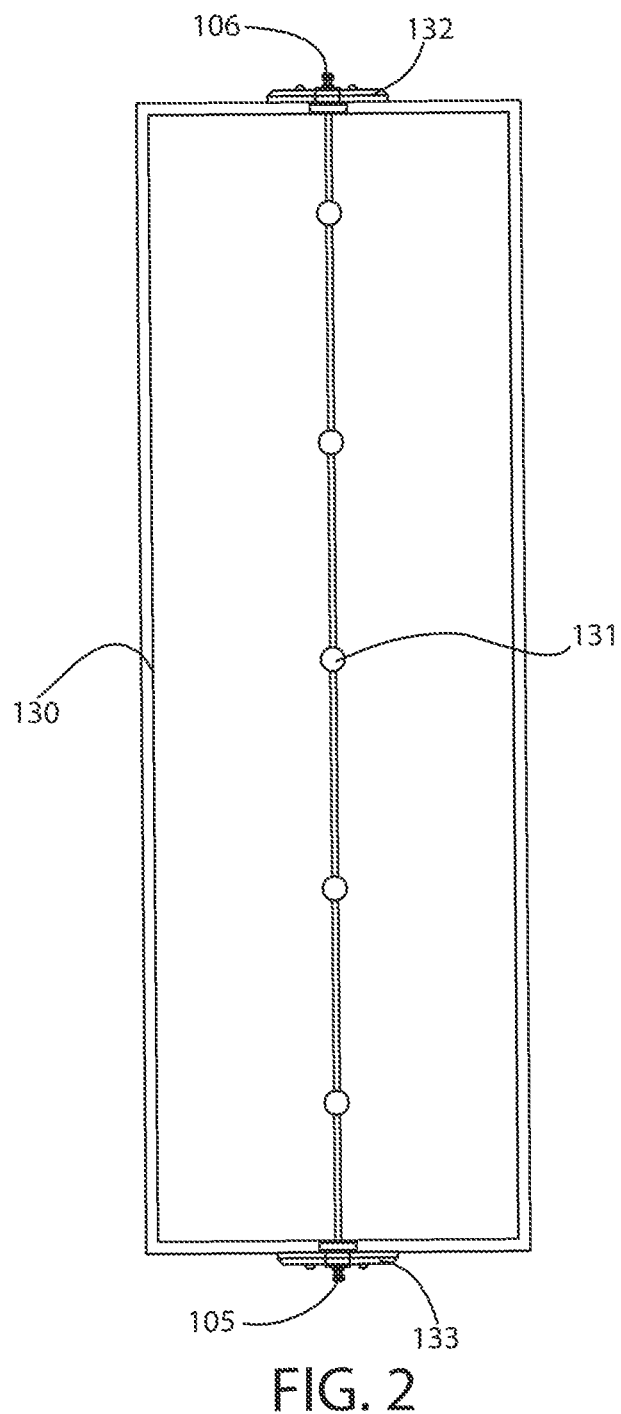
FIG. 2 is a plan view of an exemplary tray on a segment of chain for a vertical conveyor system according to principles of the invention.
Figure 3:
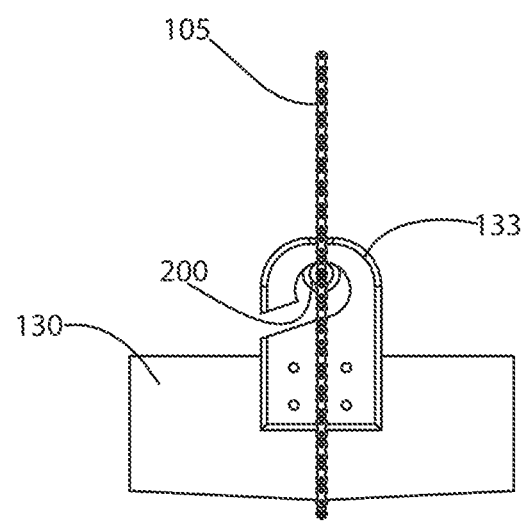
FIG. 3 is a side view of an exemplary tray on a segment of chain for a vertical conveyor system according to principles of the invention.
Figure 4:
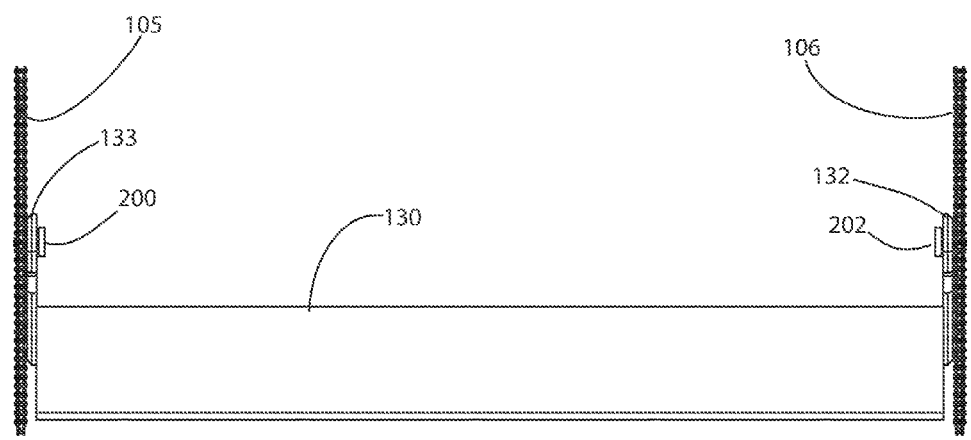
FIG. 4 is a front view of an exemplary tray for a vertical conveyor system according to principles of the invention.
Figure 5:
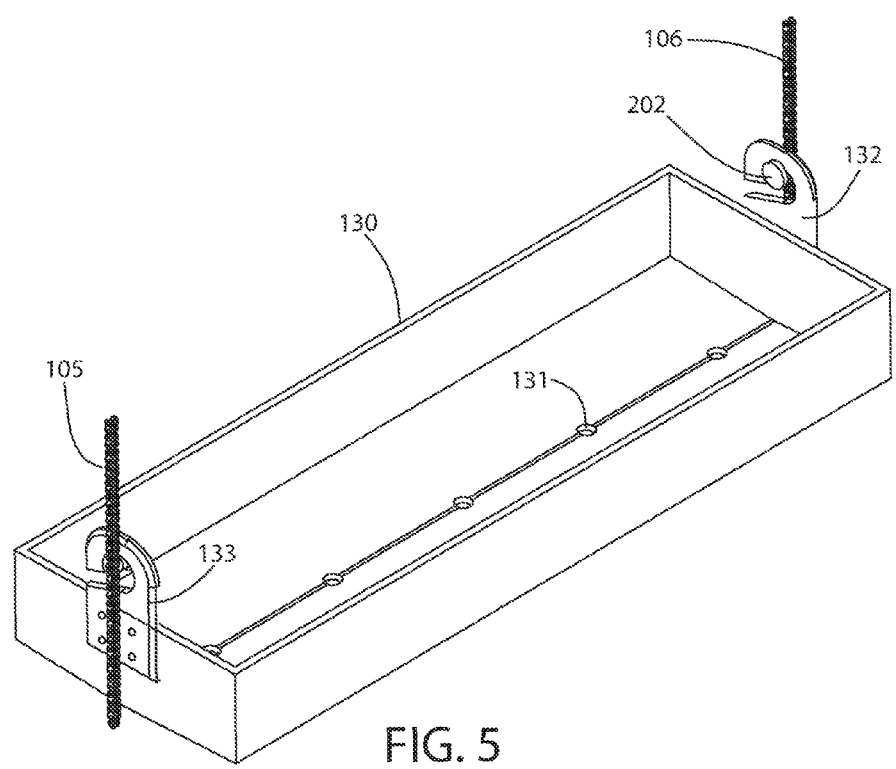
FIG. 5 is a perspective view of an exemplary tray on a segment of chain for a vertical conveyor system according to principles of the invention.
Figures 6, 7:
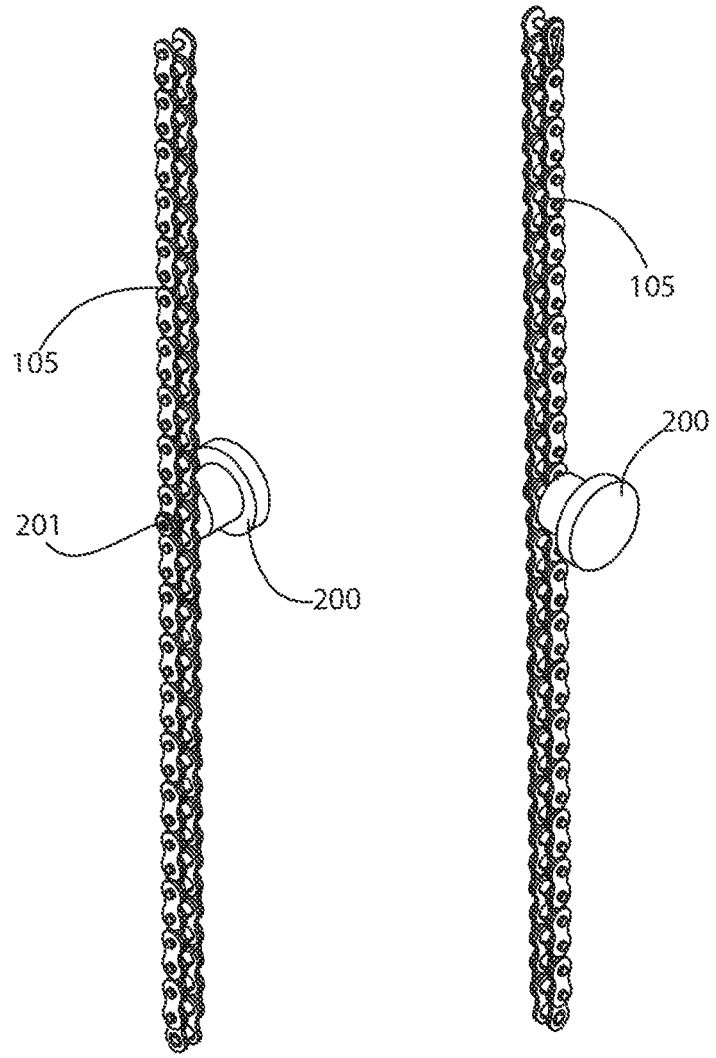
FIG. 6 is a perspective view of a segment of a chain for a vertical conveyor system according to principles of the invention.
FIG. 7 is a perspective view of a segment of a chain for a vertical conveyor system according to principles of the invention.
Figure 8:
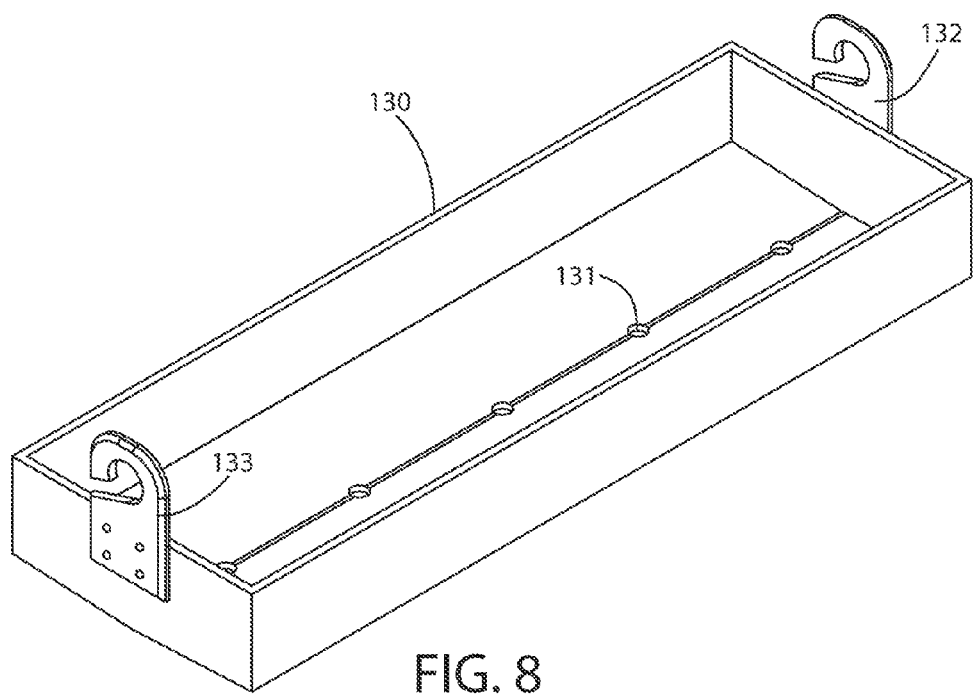
FIG. 8 is a perspective view of a tray for a vertical conveyor system according to principles of the invention.

FIG. 1 provides a schematic of an exemplary vertical conveyor system 100 with a sub-floor dark zone 155 according to principles of the invention. The vertical conveyor system 100 includes chains 105 (i.e., roller chains), each trained around at least four cogs 110, 115, 120, 125, at least one of which 110 is operably coupled to a motor coupled to a power supply and controller 185. One continuous chain is shown in FIG. 1. It is understood to persons of ordinary skill in the art that a similar spaced apart parallel chain 106 (FIGS. 2, 4, 5, 9-12) is provided, with growing trays suspended between the parallel continuous chains. The power supply and controller 185 energizes the motor in a controlled manner. Any suitable source of electric power for the motor 110 may be provided, including but not limited to utility main power. The controller 185 may comprise one or more switches (e.g., an on-off switch), one or more relays, a programmable logic controller (PLC), and/or any other control system capable of delivering electric power to drive the motor 110 in a controlled manner.

The chains 105, 106 define a path of travel, including two vertical segments 105a, 105d and two horizontal segments 105b, 105t. The chains 105, 106 are arranged in parallel. The entire path of travel is a certain distance, d, which can be divided into equal segments, e.g., 24 segments, each representing the distance covered in one time increment. The distance of travel over each time increment is a segment. By way of example, each determined time increment, e.g., 1 hour, the chain advances by one segment. For a conveyor with 24 evenly spaced trays and a 24 hour cycle, each tray may advance one segment per hour and complete an entire cycle, of 24 segments, in 24 hours.

The motor 110 may rotate continuously or in steps to achieve the desired rate of travel (e.g., one segment per hour). In each case, the rotation advances the chain one segment per time increment (e.g., one segment per hour, with each segment being ¹⁄₂₄th of the cycle). In the former case, the advancement is continual and progressive. In the latter case, the advancement is in one or more separate steps, with periods of rest between the steps. To avoid jerking and swinging of the hanging trays, continuous steady motion is preferred. One or more gear trains, belts and pulleys, or chains and pulleys, or other transmissions may be provided to manage the torque and speed of travel.

In an exemplary embodiment, twenty-four trays 130 are evenly spaced along the chain 105. Each segment is the distance between successive trays. Each tray 130 is spaced one segment 135 apart from the next tray, and at least one tray width or more 185 apart from an opposite tray on vertical segments 105a, 105d of the conveyor 100. The number of segments in a complete cycle and length of each segment determine the length of the entire path of travel, which determines the height of and width of the path of travel and the conveyor. The horizontal distance 185 must be sufficient to accommodate at least one tray between the vertical segments 105a, 105d at the top 105t of the conveyor without collision or interference. In this manner, the tray 130t traveling along the top 105t does not interfere with the adjacent trays. In a preferred implementation, width (i.e., horizontal length) at the bottom 105b and top 105t are about the same, and the ascending vertical segment of travel 105a is substantially parallel to the descending vertical segment of travel 105d. The horizontal segments of travel at the top 105t and bottom 105b may be substantially straight or curved.

Each segment provides sufficient distance between successive trays to allow proper plant growth and illumination. By way of example, each segment may be about 22 to 50 inches. The length of each segment will depend upon the maximum height of the plant contained in the tray during its growth cycle. The segment length should be at least greater than the maximum plant height.

A floor 140 separates a dark (un-illuminated) sub-floor space 155 (the dark zone) from an illuminated above-floor space 160 (the illuminated zone). The sub-floor space 155, also referred to as the dark zone, is devoid of any appreciable electric lighting that would sustain photosynthesis in the plants. Lighting required by local laws, such as emergency and exit lighting, may be provided in the dark zone, as such lighting is insufficient to appreciably drive photosynthesis. Any windows in the sub-floor space 155 in the vicinity of the plants should be covered to substantially limit or prevent natural light from entering the space in the vicinity of the plants. Window coverings such as paint or blackout curtains may be used. While in the sub-floor space, plants experience a period of relative darkness and avoid excess light and heat that may otherwise inhibit growth (e.g., by leading to photoinhibition) or otherwise damage the plant.

The sub-floor space 155 also exposes the plant to light and temperature conditions that mimic a natural circadian rhythm, with a 24-hour cycle including hours of light and warmth followed by hours of darkness and relative coolness. As is well known, the earth rotates on its axis every 24 hours, with the result that any position on the earth's surface alternately faces toward or away from the sun—day and night. That the metabolism, physiology, and behavior of plants thrive when the plants experience nature's repeating cycles of day followed by night is well known. In the above-floor illuminated space 160, plants experience lighting and temperature conditions that are similar to those provided by a natural daytime. Within the sub-floor 155 dark zone plants experience a period of darkness and lower temperature that are similar to those provided by a natural nighttime. Thus, the invention mimics nature's repeating cycles of day followed by night, for the benefit of the plants.

The floor includes an opening 150 for a descending tray, and another opening 145 for an ascending tray to pass through. The openings are sized to allow passage of the trays, without substantial additional space. Trays at and above the openings 145, 150 block most light from the illuminated zone 160 from entering the dark zone 155.

The dark zone 155 is not only un-illuminated and relatively dark, but also cooler in temperature than the illuminated zone 160. Hot air rises. Lighting that generates heat is located in the illuminated zone 160. Thus, the dark zone 155, which is far below the light sources in the illuminated zone 160, is appreciably cooler than the illuminated zone 160. Consequently, the dark zone 155 not only provides plants relief from excessive lighting, but also helps cool plants, which reduces risk of heat stress and mimics the cooling effect of a natural nighttime.

Optionally, flexible flaps 145a, 145b, 150a, 150b, may be provided at each opening 145, 150 to allow passage of trays. As a tray impacts the flaps 145a, 145b, 150a, 150b, the flaps 145a, 145b, 150a, 150b are deflected in the direction of travel. After passage of the tray, each deflected flap 145a, 145b, 150a, 150b returns to an undisturbed position. In this manner, the flaps 145a, 145b, 150a, 150b help reduce the size of the openings 145, 150 in the floor 140, to reduce opportunity for light and heat to enter the dark zone 155. The flaps 145a, 145b, 150a, 150b may be comprised of hinged panels that are spring biased to an undeflected position that minimizes the size of the opening 145, 150; or resilient plastic or rubber panels that tend to return to an undeflected position that minimizes the size of the opening 145, 150; or resilient plastic, or rubber or brush bristle gaskets that extend inwardly from the periphery of each opening 145, 150.

A plurality of lighting elements 170, 175, 180, 190 may be provided between the ascending and descending segments, and/or alongside each ascending and descending segment, and/or at or near the top of each segment. In a greenhouse with multiple vertical conveyors arranged side by side, lighting may be provided between adjacent conveyors.

While the invention is not limited to any particular form of lighting, LED lighting of wavelengths effective for photosynthesis are preferred. Additionally, the lighting is preferably effective for providing a determined DLI for each tray while in the illuminated zone 160. In one non-limiting example, each light assembly 170, 175, 180, 190 may include red, amber, green, and blue LEDs. By way of example and not limitation, each assembly may include 40% Red, 20% Amber, 20% Green, and 20% Blue. In another embodiment, the light source may comprise a combination of red LEDs and either a fluorescent or high pressure sodium light. Red LEDs may consist of at least 2 different Red LED frequencies to broaden the red frequency spectrum. Additionally, in a preferred embodiment, the light assembly provides about 60 watts of LEDs per linear foot of fixture or 6 square feet of light coverage. Series of LEDs may be dimmed either by pulse-width modulation or by lowering the forward current, either of which can be accomplished using a PLC 176 and/or compatibly configured LED drivers coupled top or integrated with each light assembly. Such a PLC 176 and/or compatibly configured LED drivers may be provided for each light assembly 170, 175, 180, 190. Using such a system, the light intensity of one color (e.g., the blue spectrum) may be increased during germination/propagation, and the light intensity of another spectrum (e.g., the Red spectrum) may be increased during a plant grow out period. Each LED of a particular color may be controlled separately so that it can be adjusted independently based on the phase of the plant growth or other factors that are found to be required. A controller, such as PLC 176, may be set to activate a lighting color or combination of colors that generates the greatest plant growth based on the phase of plant growth for the individual plant type.

One or more irrigation and or fertigation assemblies 165 may be positioned in a manner to deliver water and nutrients to trays containing plants as they travel along the path. In a preferred embodiment, the water and nutrients are directed at the trays, as they pass one or more determined positions, such as, but not limited to, the top position of an ascending segment 105*a*. Excess water and nutrients may drip from a tray to a tray below it and/or to a container for recycling and reuse.

A greenhouse may contain a plurality of conveyors as described above. By way of example and not limitation, the plurality may comprise conveyors arranged in rows and columns.

The dark zone 155 is described above as a sub-floor space. In a preferred embodiment, a floor 140 is constructed. The space below the floor (e.g., a basement) comprises the dark zone 155. In another implementation within the scope of the invention, the dark zone comprises a trench that extends below the working level. A panel may extend across the trench between the ascending and descending segments. In this manner, workers may stand upon the ground level, which may serve as the floor 140. Thus, floor as used herein encompasses both the ground and a constructed floor 140. The floor 140 is the surface in the illuminated zone that workers may stand upon to access the conveyor. The volume of space extending below the floor into which the trays travel on the bottom portion of the cycle 105*b*, is the sub-floor space, also referred to herein as the dark zone or un-illuminated zone.

With reference to FIGS. 2 through 8, an exemplary tray 130, with support hooks 132, 133 on support bolts 200, 202 attached to links of chains 105, 106 are shown. A chain segment 105, 106, is attached, with a screw or shaft 201 through a link, to a bolt 200, 202, as more clearly depicted in FIGS. 6 and 7. The hooks 132, 133 engage bolts 200, 202 on the chains 105, 106. The tray is suspended from the hooks 132, 133 engaging bolts 200, 202 on the chains 105, 106. Other couplings of a tray 130 to a chain may be utilized without departing from the scope of the invention. The depicted support hooks 132, 133 on support bolts 200, 202 allow convenient removal and installation of each tray, while suspending each tray from the bolts 200, 202.

The path of travel is defined by movement of the parallel chains 105, 106. The chains move 132, 133 in unison. Both chains may be driven by the same motor coupled to a sprocket that drives each chain. Both chains are simultaneously driven at the same speed in the same direction. Opposed bolts 200, 202 remain in alignment throughout the cycle of motion.

Each tray may be equipped with one or more drain holes 131. The bottom of each tray may be angled towards one or more drain holes 131. Excess liquid (e.g., irrigation water and/or fertigation nutrients) may drain from a tray into a tray below, until all liquid is absorbed by the plant media or consumed by the plants. This reduces waste.

The bolts 200, 202 provide pivot points. As the center of mass of each tray 130 is below the hooks 132, 133 and bolts 200, 202, and the hooks 132, 133 of the tray are free to pivot on the bolts 200, 202, the tray 130 remains upright throughout the cycle of travel.

Figure 9:
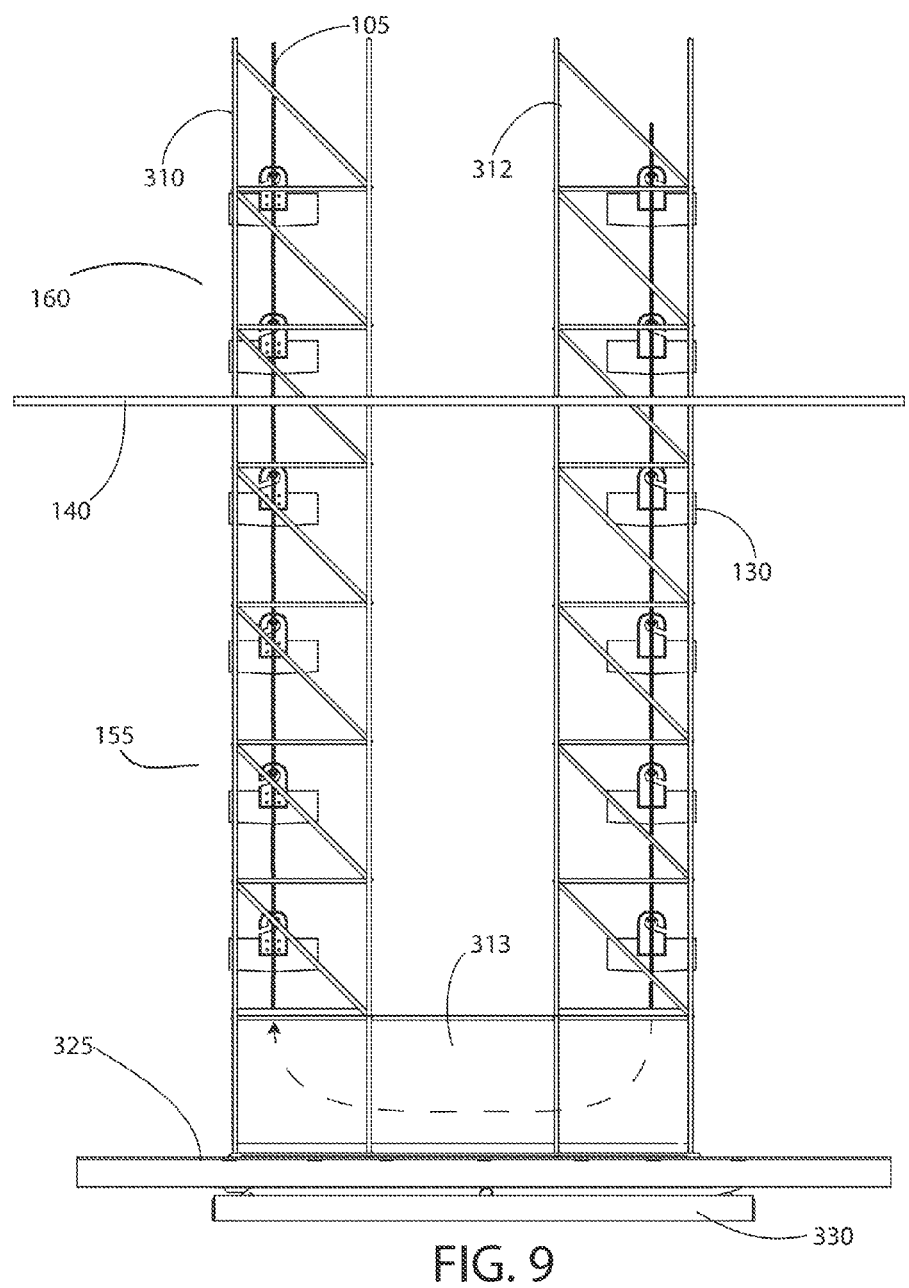
FIG. 9 is a front side view of a bottom portion of an adjustable height vertical conveyor in a lowered position according to principles of the invention.
Figure 10:
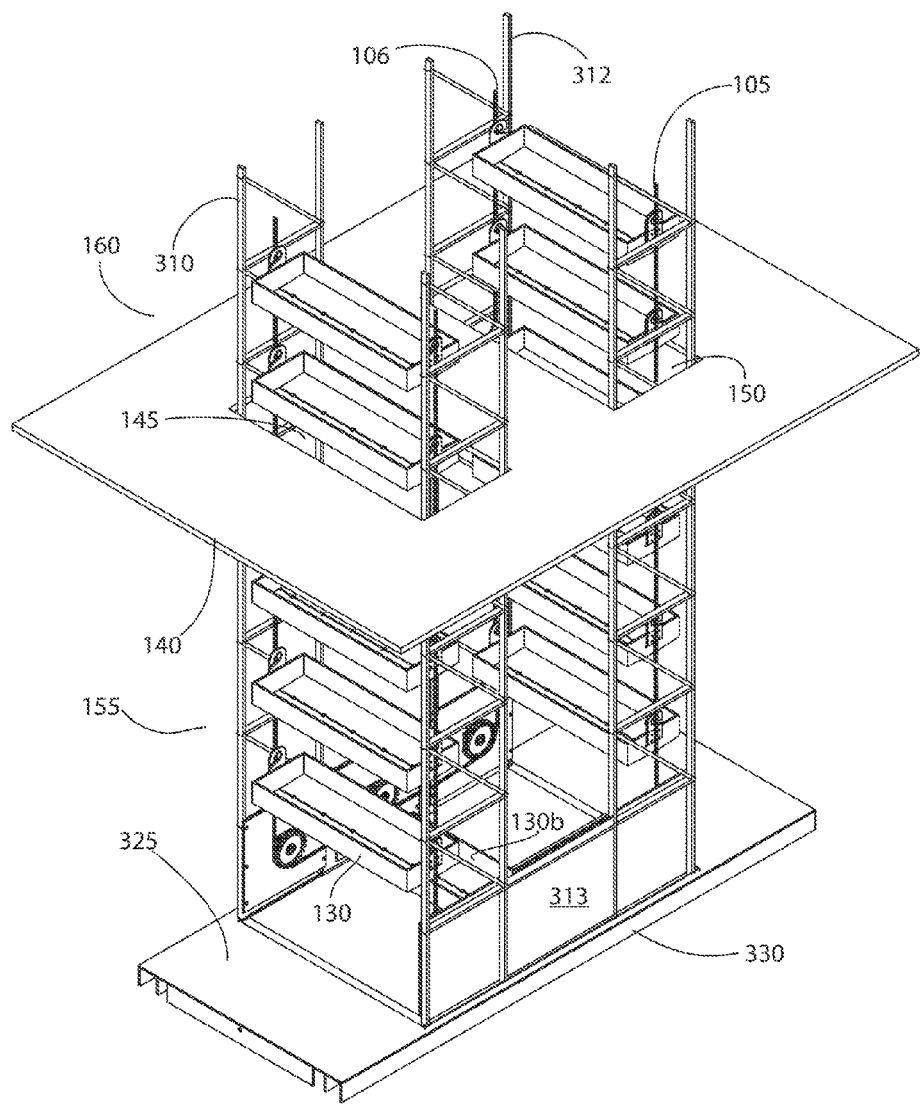
FIG. 10 is a perspective view of a bottom portion of an adjustable height vertical conveyor in a lowered position according to principles of the invention.

In one exemplary embodiment, the bottom of the conveyor 100 is supported on a height adjustable platform. By raising or lowering the height of the bottom of the conveyor, the portion of the conveyor in the dark zone may be adjusted. More or less of the conveyor may be in the dark zone, depending upon the needs of the particular plants, and the lighting being supplied in the illuminated zone. Height adjustment may be automated, e.g., pre-programmed and effectuated with a PLC, or manual, e.g., achieved by cranking a winch or pumping a hydraulic ram. FIGS. 9 and 10 illustrate a bottom portion of a vertical conveyor on a platform 325 in a lowered position according to principles of the invention. Sprockets 300, over which chains 105, 106 are trained, are rotationally mounted to panels 313 or other support structures connected to a support frameworks 310, 312. Only a bottom portion of the conveyor support framework 310, 312 is depicted for clarity, it being understood that the support framework may extend upwardly to the top of the conveyor, and include additional sprockets and elements.

Elevating the height in the dark zone reduces the portion of the conveyor in the dark zone while increasing the portion of the conveyor in the illuminated zone. Lowering the height in the dark zone increases the portion of the conveyor in the dark zone while decreasing the portion of the conveyor in the illuminated zone.

A lifting mechanism, such as, but not limited to a scissor lift, may be provided to adjust the height of the conveyor in the dark zone. In one nonlimiting example, the scissor lift includes a base 330, a support platform 325 linearly moveable relative to the base 330, and a lifting mechanism between the base 330 and platform 325. The lifting mechanism may comprise scissor arms 335, 340 moveable with linear actuators, such as hydraulic or pneumatic cylinders 345, or other linear actuators such as leadscrew actuators.

Figure 11:
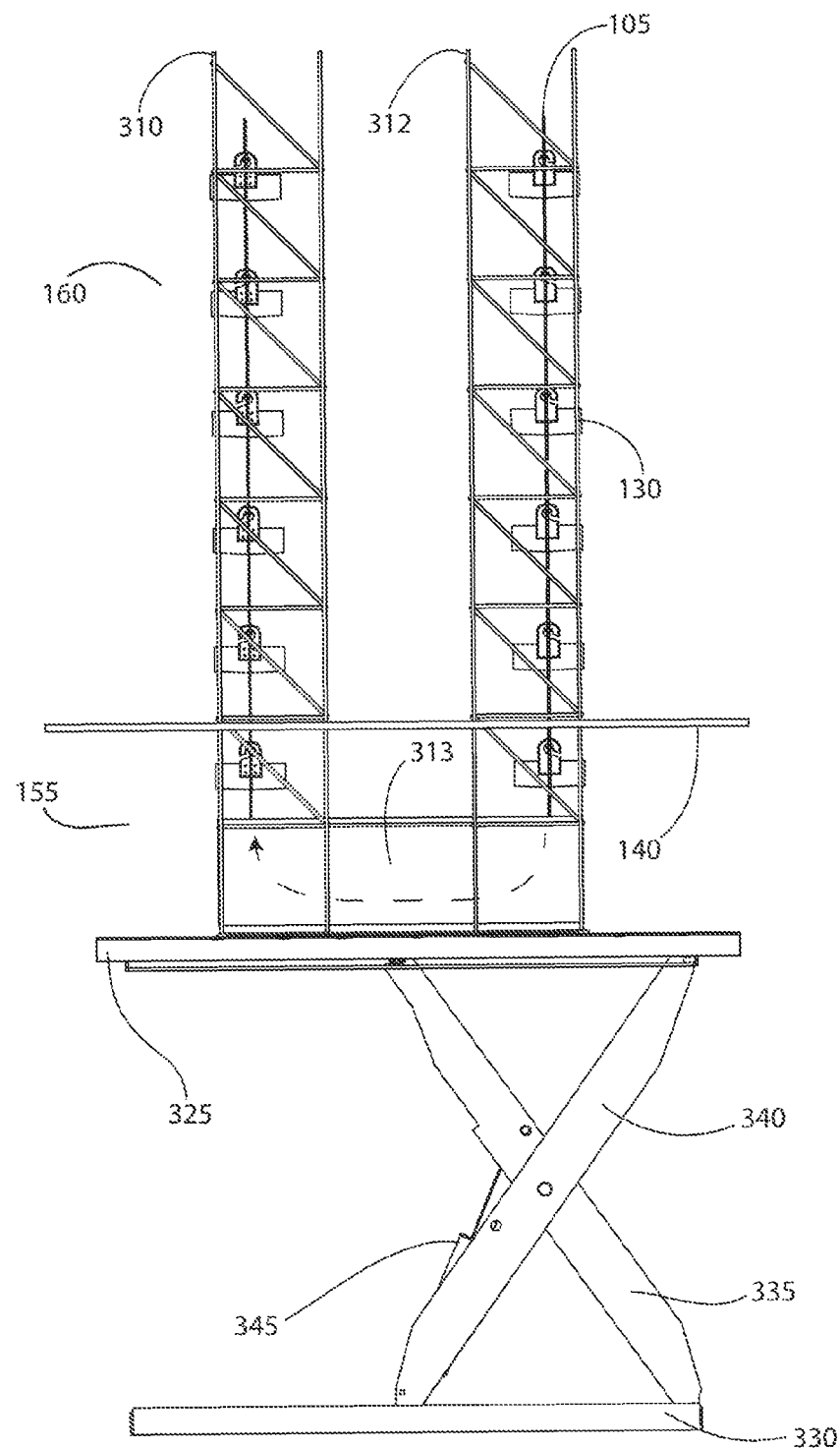
FIG. 11 is a front side view of a bottom portion of an adjustable height vertical conveyor in a raised position according to principles of the invention.
Figure 12:
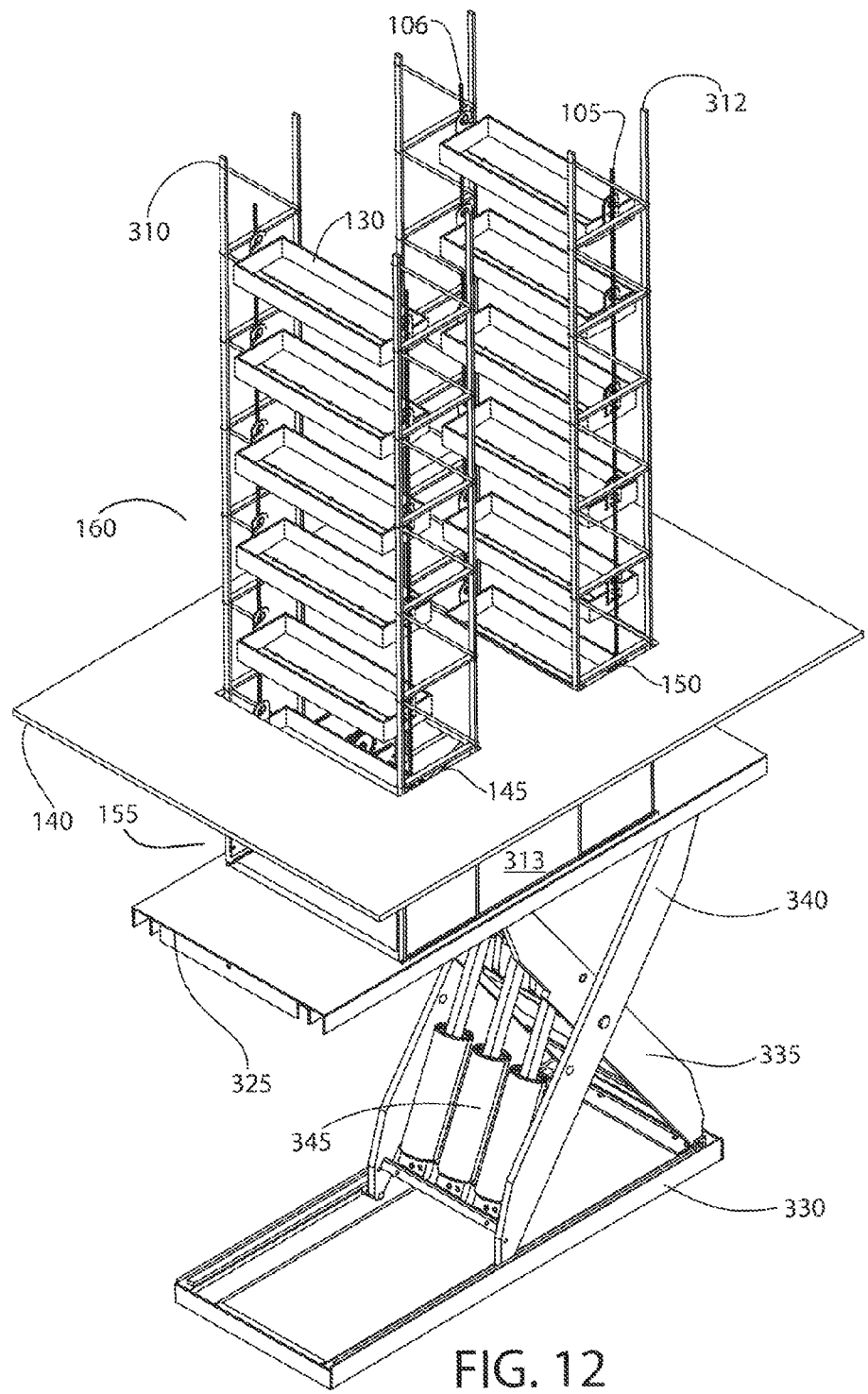
FIG. 12 is a perspective view of a bottom portion of an adjustable height vertical conveyor in a raised position according to principles of the invention.

In the raised position as shown in FIGS. 11 and 12, only 3 trays are below the floor 350 in the un-illuminated space 155. Two of the trays below the floor 350 are readily visible, while the third is behind the panels 313 that support the sprockets that guide the chain from the descending side 312 to the ascending side 310. The remainder of the trays on the conveyor are above the floor in the illuminated space 160.

In the lowered position as shown in FIGS. 9 and 10, 9 trays are below the floor 350 in the un-illuminated space 155. Eight of the trays below the floor 350 are readily visible, while the ninth is behind the panels 313 that support the sprockets that guide the chain from the descending side 312 to the ascending side 310. The remainder of the trays on the conveyor are above the floor in the illuminated space 160.

In an embodiment with a lifting mechanism and a stationary floor 350, such as the embodiment illustrated in FIGS. 9 through 12, the number of trays below the floor 350 can be controlled by raising or lowering the bottom of the conveyor. The lifting mechanism may be lowered, fully raised or partially raised. Thus, the number of trays below the floor 350 may be adjusted within a range from a minimum number of trays (e.g., 3 in FIGS. 11 and 12), corresponding to the fully raised position, to the maximum number of trays (e.g., 9 in FIGS. 9 and 10), corresponding to the fully lowered position. With each tray advancing to the next position in the cycle in a determined time period (e.g., an hour), the number of trays below the floor indicates the duration of darkness. Illustratively, if there are 24 trays in a conveyor, and 3 trays are below the floor, and each tray advances to the next tray position in an hour, then in a 24 hour period each tray spends 3 hours below the floor in darkness or relative darkness. and the remainder of the 24 hour cycle above the floor in the illuminated region where irrigation and fertigation may be provided. If there are 24 trays in a conveyor, and 9 trays are below the floor, and each tray advances to the next tray position in an hour, then in a 24 hour period each tray spends 9 hours below the floor, in darkness or relative darkness, and the remainder of the 24 hour cycle above the floor in the illuminated region where irrigation and fertigation may be provided.

The number of trays below the floor and the corresponding time spent in darkness may be varied. In the example described above, the number of trays below the floor, $n_d$, may be 3, or 5, or 7, or 9. In the example given above, each tray may spend 3, or 5, or 7, or 9 hours below the floor, in darkness or relative darkness. The invention is not limited to a maximum of 9 trays below the floor, rather the maximum may be any number of trays that can fit in the space provided below the floor, including but not limited 11 or 13 trays.

The equation below provides the amount of time, $t_d$, that each tray spends below the floor, in darkness or relative darkness, for a conveyor with a period, T, and a total number of evenly spaced trays, $n_t$, including a portion of the total number of trays below the floor $n_d$:

$$t_d = \frac{n_d}{n_t} \times T \qquad \text{Eq. 1}$$

The period, T, is the total amount of time for a tray to travel a complete cycle in the conveyor. Thus, if a tray starts at the top of the conveyor, in one period the tray will have descended the descending side of the conveyor, traversed the bottom of the conveyor, ascended the ascending side of the conveyor, and returned to the top of the conveyor.

The frequency, f, equals 1/T. Therefore:

$$t_d = \frac{n_d}{n_t \cdot f} \qquad \text{Eq. 2}$$

Applying Eq. 1 to a conveyor with a 24 hour period, T, and 24 evenly spaced trays, $n_t$, including 5 trays below the floor (i.e., in darkness) at a time, $n_d$, yields 5 hours as the amount of time, $t_d$, that each tray spends below the floor, in darkness or relative darkness, during a complete period. The amount of time, $t_d$, that each tray spends below the floor, in darkness or relative darkness, during a complete period, may be increased by increasing the number of trays below the floor (i.e., in darkness) at a time, $n_d$, and/or by increasing the period, T, and/or by decreasing total number of evenly spaced trays, $n_t$. Conversely, the amount of time, $t_d$, that each tray spends below the floor, in darkness or relative darkness, during a complete period, may be decreased by decreasing the number of trays below the floor (i.e., in darkness) at a time, $n_d$, and/or by decreasing the period, T, and/or by increasing total number of evenly spaced trays, $n_t$.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A vertical horticulture conveyor system for growing plants, said system including:
   a path of travel defined by a pair of spaced apart continuous roller chains, the pair of spaced apart continuous roller chains being in parallel alignment, each of the pair of spaced apart continuous roller chains comprising a plurality of coupled pivoting links, the path of travel including a top section having a first end and an opposite second end, a bottom section having a first end and an opposite second end, a descending section extending from the second end of the top section to the second end of the bottom section, and an ascending section opposite the descending section and extending from the first end of the top section to the first end of the bottom section; and
   a motor operably coupled to at least one of the pair of spaced apart continuous roller chains and causing the links of the pair of spaced apart continuous roller chains to move in unison along the path of travel; and
   a plurality of plant trays, each tray being removably attached to and suspended upright between the pair of spaced apart continuous chains; and
   a floor with first and second openings, the ascending section of the path of travel extending through the first opening, and the descending section of the path of travel extending through the second opening; and
   a space above the floor being illuminated, and a space below the floor being substantially devoid of illumination; and
   the bottom section of the path of travel being in the space below the floor, and the top section of the path of travel being in the space above the floor; and
   the path of travel including an above-floor portion of the ascending section of the path of travel in the space above the floor, and a below-floor portion of the ascending path of travel in the space below the floor, an above-floor portion of the descending section of the path of travel in the space above the floor, and a below-floor portion of the descending path of travel in the space below the floor.

2. The vertical horticulture conveyor system according to claim 1,
   each of the plurality of plant trays including an open top; and
   each of the plurality of plant trays including a right side and a left side, the right side being opposite the left side; and
   each of the plurality of plant trays further including a pair of suspension hooks, including a right side suspension hook attached to the right side of the plant tray, and a left side suspension hook attached to the left side of the plant tray, the right side hook being opposite the left side hook, and each of the pair of suspension hooks extending upwardly above the open top of the plant tray; and
   a pair of bolts for each of the plurality of plant trays, each pair of bolts including a right side bolt and a left side bolt, each right side bolt attached to one of the pivoting links of one of the pair of spaced apart continuous roller chains, each left side bolt attached to one of the pivoting links of the other of the pair of spaced apart continuous roller chains, each right side bolt of each pair of bolts being opposite and in alignment with the left side bolt for the pair of bolts; and
   each of the plurality of plant trays suspended by the suspension hooks from the pair of bolts.

3. The vertical horticulture conveyor system according to claim 2,
   each of the plurality of plant trays suspended by the suspension hooks from the pair of bolts having a center of mass below the pair of bolts.

4. The vertical horticulture conveyor system according to claim 3, each of the continuous roller chains being trained over a plurality of sprockets.

5. The vertical horticulture conveyor system according to claim 4, each of the first and second openings being sized to allow passage of each of the plurality of plant trays suspended by the suspension hooks from the pair of bolts without any of the plurality of plant trays contacting the floor.

6. The vertical horticulture conveyor system according to claim 5, further comprising a flexible flap at each of the first and second openings, said flexible flap deflecting to allow passage of each of the plurality of plant trays.

7. The vertical horticulture conveyor system according to claim 2, the plurality of plant trays being evenly spaced apart.

8. The vertical horticulture conveyor system according to claim 7, each of the plurality of plant trays traveling the entire path of travel in a cycle, the cycle being a time duration, the cycle including a first portion and a second portion, the first portion of the cycle being a time duration above the floor, and the second portion of the cycle being a time duration below the floor.

9. The vertical horticulture conveyor system according to claim 8, the cycle being about 24 hours.

10. The vertical horticulture conveyor system according to claim 9, the first portion being from 12 to 21 hours.

11. The vertical horticulture conveyor system according to claim 9, the second portion being from 3 to 12 hours.

12. The vertical horticulture conveyor system according to claim 8, the plurality of plant trays being 24 evenly spaced apart plant trays.

13. The vertical horticulture conveyor system according to claim 12, the cycle being about 24 hours and each of the plurality of plant trays traveling about 1/24th of the path of travel per hour.

14. The vertical conveyor system according to claim 1, further comprising a height adjustable lift in the space below the floor, the lift supporting the path of travel and controlling a distance of the bottom section of the path of travel to the floor, elevating the bottom section of the path of travel to reduce the distance between the bottom section of the path of travel and the floor and reduce the below-floor portion of the path of travel, and lowering the bottom section of the path of travel to increase the distance between the bottom section of the path of travel and the floor and increase the below-floor portion of the path of travel.

15. The vertical conveyor system according to claim 14, the height adjustable lift comprising a scissor lift.

16. The vertical horticulture conveyor system according to claim 15, each of the plurality of plant trays traveling the entire path of travel in a cycle, the cycle being a time duration, the cycle including a first portion and a second portion, the first portion of the cycle being a time duration above the floor, and the second portion of the cycle being a time duration below the floor.

17. The vertical horticulture conveyor system according to claim 16, the cycle being about 24 hours.

18. The vertical horticulture conveyor system according to claim 17, the first portion being adjustable from 15 to 21 hours.

19. The vertical horticulture conveyor system according to claim 17, the second portion being adjustable from 3 to 9 hours.

20. The vertical horticulture conveyor system according to claim 17, the plurality of plant trays being 24 evenly spaced apart plant trays, the cycle being about 24 hours and each of the plurality of plant trays traveling about 1/24th of the path of travel per hour.

* * * * *